United States Patent [19]
Johnson

[11] 4,106,020
[45] Aug. 8, 1978

[54] FM-CW RADAR RANGING SYSTEM

[75] Inventor: Henry Charles Johnson, Neshanic, N.J.

[73] Assignee: RCA Corporation, New York, N.Y.

[21] Appl. No.: 817,686

[22] Filed: Jul. 21, 1977

[51] Int. Cl.² ............................................. G01S 9/24
[52] U.S. Cl. ...................................... 343/14; 343/17.5
[58] Field of Search ................................. 343/14, 17.5

[56] References Cited
U.S. PATENT DOCUMENTS 4,008,475  2/1977  Johnson ................................ 343/14

Primary Examiner—Maynard R. Wilbur
Assistant Examiner—Richard E. Berger
Attorney, Agent, or Firm—H. Christoffersen; Joseph D. Lazar; Raymond E. Smiley

[57] ABSTRACT

A frequency-modulated continuous wave (FM-CW) ranging system includes apparatus which utilizes a target simulating delay line and scaling device to compensate for undesired changes of the FM modulation waveform.

11 Claims, 3 Drawing Figures

FM-CW RADAR RANGING SYSTEM

BACKGROUND OF THE INVENTION

1. Field of the Invention

The present invention relates to continuous wave frequency-modulated (FM-CW) ranging systems and, in particular, to a modulation rate and frequency excursion drift compensator for use in such systems.

2. Description of the Prior Art

FM-CW radar ranging interrogating systems are well known in the art. In such systems, a radio frequency (RF) interrogation signal, frequency modulated with a given modulation waveform, is transmitted toward a target and reflected therefrom back to the interrogating system. The reflected signal as received at the interrogating system is delayed in time, and hence shifted in frequency, from the instantaneous interrogation signal by an amount ($\tau$) proportional to the range (R) of the target. For example, when the interrogation signal is modulated by a triangular waveform having a peak value of $\Delta F$, a period of $1/f_m$, the frequency shift or difference frequency $f_R$ (also commonly known as beat frequency) as generated by a suitable filtered mixer receptive of the reflected signal and a signal indicative of the interrogation signal, is equal to the time derivative of the frequency of the interrogation signal times the round trip time delay, $\tau$, and may be expressed as:

$$f_R = df/dt \cdot \tau = 4R (\Delta F \cdot f_m)/C \qquad (1)$$

where C is the speed of light. The range, R, or distance between the target and the interrogating system and, additionally, the range rate of the target relative to the system is determined by measurement of the frequency shift $f_R$. Rearranging formula (1) provides the formula for range.

$$R = f_R \cdot C/4 (\Delta F \cdot f_m) \qquad (2)$$

or $$R = K \cdot f_R \qquad (3)$$

where $$K = C/4 (\Delta F \cdot f_m)$$

if $\Delta F$ and $f_m$ remain constant, K remains constant.

In practice, such FM-CW radar ranging systems have been plagued with errors due to drifts in the maximum frequency excursion ($\Delta F$) and/or period ($1/f_m$) of the frequency modulation waveform. Such drifts are often caused merely by changes in ambient conditions such as temperature, power supply variations and timing circuit drifts. U.S. Pat. Nos. 3,968,492 issued July 6, 1976, to G. Kaplan and 3,974,501 issued Aug. 10, 1976, to A. Ritzie, disclose signal processors for FM-CW ranging systems which make provisions for compensating for drifts in the period ($1/f_m$) of the modulation waveform. However, no provision is made for compensating for drifts in the frequency excursion ($\Delta F$) of the modulation waveform. The prior art has typically used one of two methods of compensating for drifts in frequency excursion. In one such prior art method, while the system is off line, a delay line of known length is temporarily connected between the transmitter and receiver antenna feedlines. The time delayed signal, generated by the delay line from a portion of the interrogation signal simulates a reflected signal from a target at a predetermined range. The processor is then manually adjusted to display the predetermined range and the delay line thereafter disconnected. Such a method is limited in use in that any subsequent changes in the modulation frequency or amplitude which may be undetected require recalibration of the system, again while it is off line.

A second prior art method utilizes a delay line in conjunction with a frequency discriminator in a complex closed loop stabilizing system. Such a system is described in "The Radar Handbook", M. I. Skolnik, McGraw Hill, 1970, chapter 16, pages 29-32. However, frequency discriminators are relatively expensive and not suitable for large volume usage. Such frequency discriminator systems maintain a constant frequency excursion $\Delta F$, but do not provide an accurate calibration for the drifts of $f_m$, the modulation waveform frequency. Such a ranging system must additionally employ, for example, relatively expensive crystal oscillators, temperature controlled ovens, or both U.S. Pat. No. 4,008,475 issued Feb. 17, 1977, to the present inventor uses a delay line in a feedback network to alter one of $\Delta F$ or $f_m$ to keep their product constant.

SUMMARY OF THE INVENTION

The present invention is directed to a FM-CW ranging system including means for delaying a portion of the interrogation signal by a predetermined time interval corresponding to a reflected signal from a target at a predetermined range. A first signal consisting substantially of difference signals corresponding to the predetermined range and a second signal consisting substantially of difference signals corresponding to ranges within the range domain of the system are generated; the second signal being applied to a means for determining a parameter of the same representative of target range, which means also has applied to it the first output signal for scaling the parameter.

DETAILED DESCRIPTION OF THE PREFERRED EMBODIMENT

Figure 1:
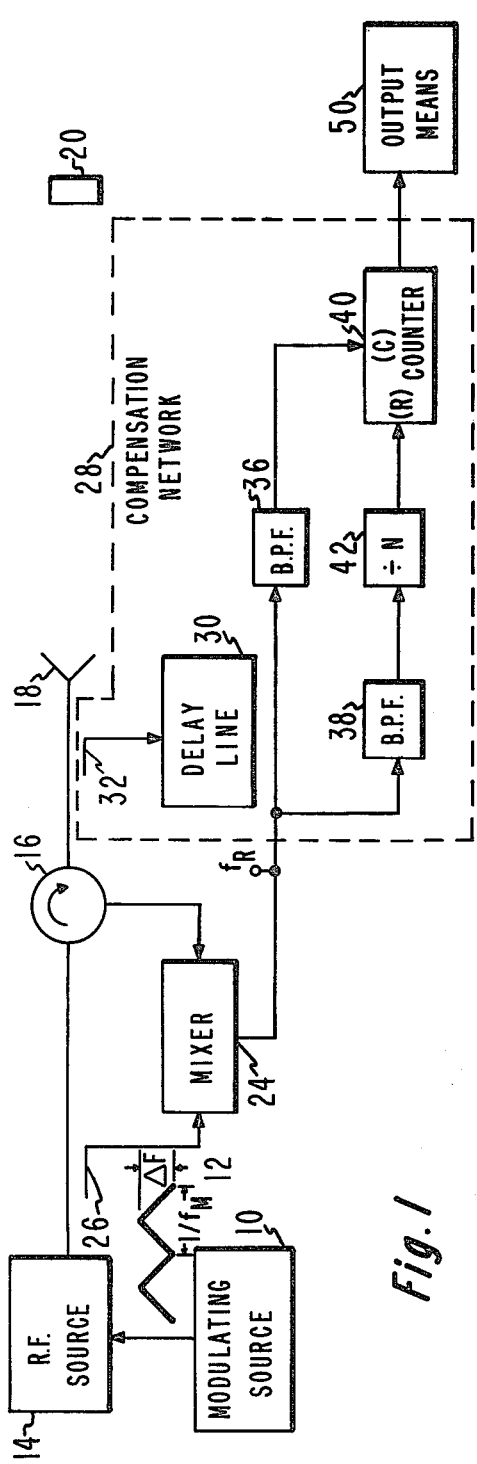
FIG. 1 is a block diagram of an FM-CW radar system in accordance with one preferred embodiment of the present invention.

As shown in FIG. 1, a modulating source 10, such as one which produces triangular waveform 12, is coupled to radio frequency source 14 for purposes of modulatng the radio frequency signal produced by source 14 in accordance with waveform 12. Waveform 12 is a plot of frequency on the vertical axis and time on the horizontal axis. The maximum frequency excursion is $\Delta F$ with a period $1f_m$. Source 14 is coupled to a suitable three port circulator 16. Circulator 16 is coupled to an antenna 18 which may be a printed circuit corporate feed antenna of the type described in U.S. Pat. No. 3,587,110 issued June 22, 1971 to O. M. Woodward or a standard gain horn antenna such as a Narda Model 640. FM-CW signals from antenna 18 are directed to and reflected from suitably disposed targets such as target 20 within the pattern of antenna 18.

Return signals to antenna 18 are directed to and reflected by circulator 16 to means for deriving difference frequency signals, $f_R$, notably a conventional mixer 24, such as the Aneren model 7G0118 mixer. Mixer 24 is also receptive of a sample of the radio frequency source 14 output signal provided by a directional coupler 26 in the line between RF source 14 and circulator 16.

The arrangement of the elements just described provides a means for enabling measurement of a parameter of interest such as the range of target 20 in a manner well known in the art. The range of target 20 can be accurately determined if the parameters of the signal from source 14 do not vary or are known. However, as mentioned in the background section, if either or both of the modulating signal parameters $f_m$ or $\Delta F$ vary without some offsetting compensation (or correction of the parameters $f_m$ or $\Delta F$) the computed range of targets such as target 20 will be incorrect. In accordance with the invention, a compensation network 28 is provided as described below.

A means of simulating a target at a known distance such as a delay line 30 used in the reflection mode is coupled to directional coupler 32. Coupler 32 is connected in the path between circulator 16 and antenna 18. Energy is coupled from the RF source 14 into the delay line 30 wherein it is delayed and reflected back through directional coupler 32 and circulator 16 into mixer 24. Delay line 30 may be of the accoustic type or simply a coaxial line. The delay in delay line 30 is chosen to be long compared to the most distance target range capability determined by the equipment sensitivity or physical limitations of real target travel. Signals from delay line 30 are also coupled via circulator 16 to mixer 24 appearing to the mixer to be an additional target at some known distance greater than are real targets. The output terminal of mixer 24 is coupled to a first bandpass filter 36 and a second bandpass filter 38. Bandpass filter 36, which passes difference frequencies associated with targets whose ranges are to be determined is coupled to the counting (C) terminal of means enabling scaling of the frequency passed by filter 36, such as a digital counting means 40. Bandpass filter 38, which passes difference frequencies associated with the simulated target, is coupled to a divide-by-N circuit 42 which is in turn coupled to the scaling terminal of the scaling means, such as the reset (R) terminal of counter 40. The output terminal of counter 40 is coupled to suitable utilization means such as an output means 50 in the form of a display device for displaying distance as a function of the maximum count reached in counter 40 before being reset by the signal from divide-by-N circuit 42. Bandpass filter 36 passes those values of frequency $f_R$ (formula 1 above) representing target ranges of interest. Bandpass filter 38 passes frequencies $f_R$ corresponding to the simulated range of delay line 30.

In one exemplary system, target ranges of interest, e.g., 6.0 to 18.5 meters from antenna 18, produce a frequency ($f_R$) having a value typically between 13 and 40 kHz while the value of the frequency ($f_R$) associated with delay 30 is typically 105 kHz. In such a system, N in divide-by-N circuit 42 may be chosen to be 105,000 such that nominally a momentary reset pulse is received at counter 40 each second. With such a system the maximum count reached in counter 40 is equal to the frequency $f_R$ of the desired target. Alternatively, the value N may be selected such that the maximum value reached in counter 40 is exactly equal to the range in desired units of measure (meters, feet, etc.) of target 20. This is a matter of design choice as determined by the particular type of utilization device for output means 50 chosen.

In operation, RF source 14 produces an RF signal continuously modulated in accordance with waveform 12 which is radiated by antenna 18 toward targets such as 20. Delayed return signals from the target 20 are received at antenna 18 and along with signals reflected from delay line 30 are passed via circulator 16 to mixer 24 which also receives a sample of the transmitted RF signal from coupler 26. Mixer 24 produces difference frequencies from the signals it receives having frequency components $f_{R1}$ and $f_{R2}$ which directly correspond respectively to the range of target 20 and the simulated "range" of delay line 30. If $\Delta F$ and $f_m$ of waveform 12 remain constant, then the relationship of the frequency generated by mixer 24 to the range of real target 20 and target simulating delay line 30 is also a constant.

Frequency $f_{R1}$ is passed by bandpass filter 36 and is adapted to advance counter 40 by, for example, one count for each cycle or each M cycles of frequency, where M is a fixed integer. Frequency $f_{R2}$ is passed by bandpass filter 38 and divided by circuit 42 to reset periodically the counter 40. Since the frequency $f_{R1}$ at C terminal of counter 40 nominally represents the distance of target 20, the number of counts in counter 40 at the end of a given time which are a measure of that frequency also correspond to the range of target 20. If the range of target 20 remains fixed but, for example, the maximum frequency excursion, $\Delta F$, of waveform 12 increases by, for example, 10 percent, then in accordance with formula 1, the frequency $f_{R1}$ also increases by the same 10 percent. However, in such a situation, since the same waveform which interrogates target 20 is also applied to delay line 30, the frequency $f_{R2}$ will also increase by the same 10 percent and therefore the counter will be reset 10 percent sooner in time (than if $\Delta F$ had not increased) and thus contain the same count when reset as was the case before $\Delta F$ increased in value. A similar situation occurs with any change in the frequency, $f_m$, of waveform 12. Thus, the difference frequency associated with any targets, such as 20, is scaled by the difference frequency associated with delay line 30 in a manner which compensates for any change in $\Delta F$ and/or $f_m$ of waveform 12.

Figure 2:
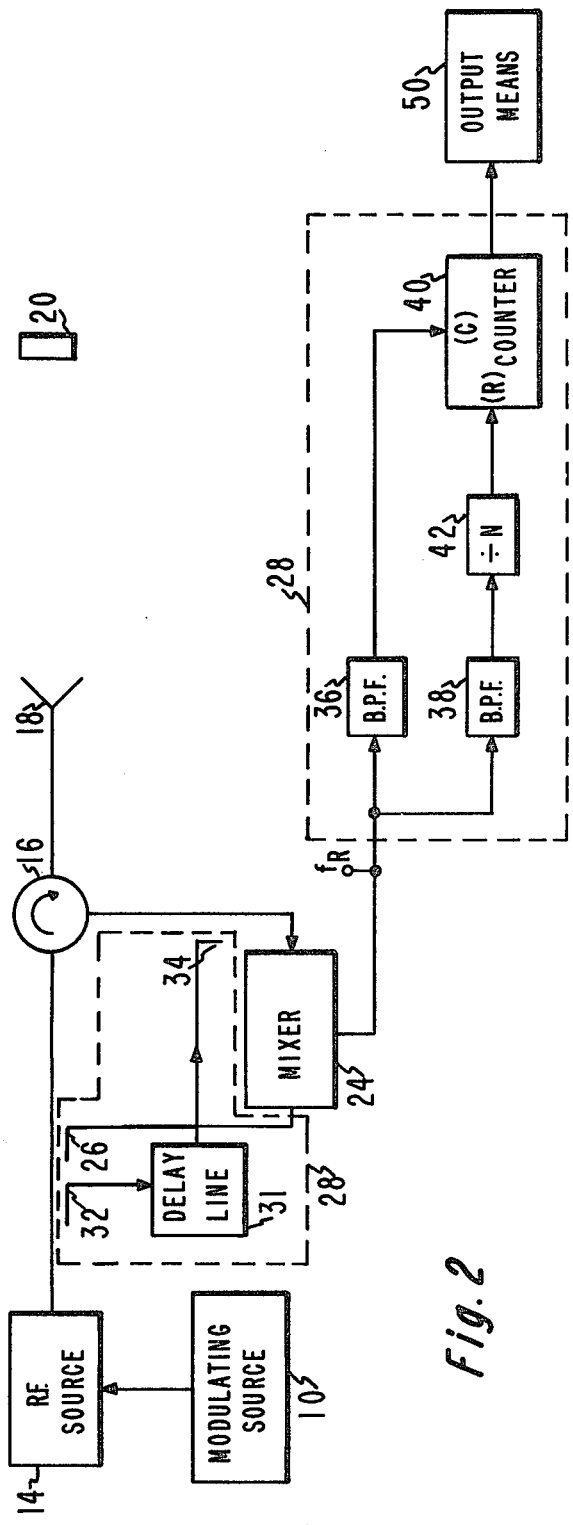
FIG. 2 is a block diagram of another FM-CW radar system in accordance with an alternate embodiment of the present invention.

The circuit of FIG. 1 may be modified as illustrated in FIG. 2 to which attention is now directed. The arrangemment of FIG. 2 is the same as that of FIG. 1 with the exception that a delay line 31, used in the transmission mode, is substituted for delay line 30. Delay line 31, which is twice as long as delay line 30 (FIG. 1) to simulate a target at the same distance as delay line 30, is adapted to receive, via coupler 32, a sample of the radio frequency signal transmitted and, after suitable delay, to pass the frequency via coupler 34 to the signal applied from circulator 16 to mixer 24. The circuit of FIG. 2 will require one additional coupler 34 in addition to a delay line doubled in length. This circuit will be less affected than the circuit of FIG. 1 by small discontinuities within the delay line that may result in undesired signal components to be injected into the bandpass filter 36. In all other respects, the circuit of FIG. 2 operates identically to that of FIG. 1.

Figure 3:
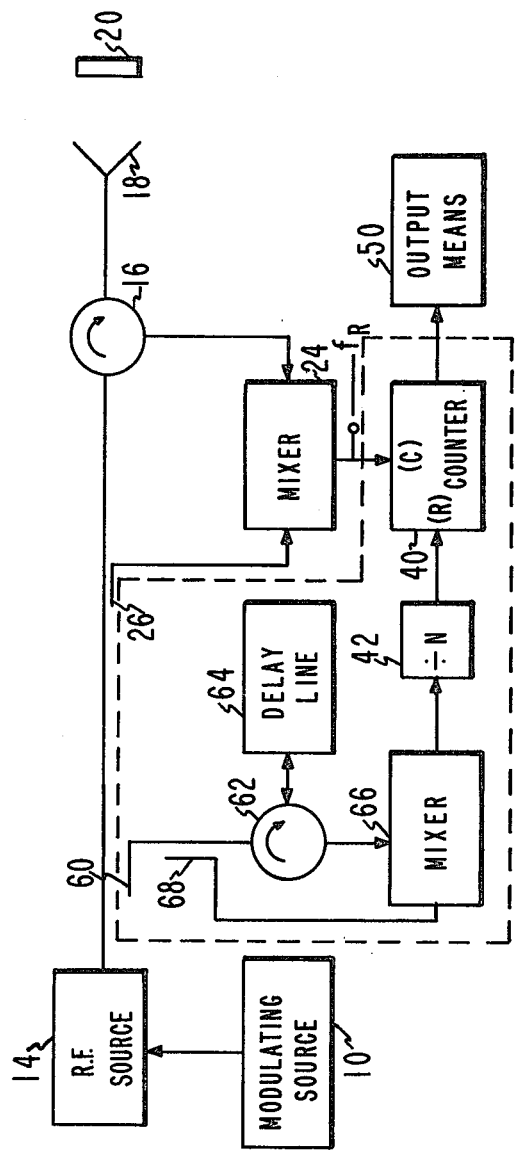
FIG. 3 is a block diagram of another FM-CW radar system in accordance with another alternate embodiment of the present invention.

Another alternate circuit is illustrated in FIG. 3 to which attention is now directed. A sample of the signal produced by RF source 14 is coupled via directional coupler 60 to an additional circulator 62 which is coupled in turn to a delay line 64. Delay line 64 is of a length such as to represent any value inside or outside of the normal range of targets but is otherwise identical to delay line 30. The output of circulator 62 is coupled to an additional mixer 66 as is a sample of the RF source 14 signal as passed from coupler 68 to mixer 66. In FIG. 3 no bandpass filters are required since the signal from a real target such as 20 and the difference frequency from the phantom target created by delay line 64 are never intermixed. In all other respects the operation of FIG. 3 is identical to that of FIG. 1. The circuit of FIG. 3 while requiring the use of an additional circulator 62 and an additional mixer 66, eliminates the need for bandpass filters and allows for any appropriate size delay line 62 rather than requiring one which falls outside the range of targets of interest as is required in the circuits of FIGS. 1 and 2.

It will be understood that a real target at a known distance may be substituted for delay lines 30 and 62 in FIGS. 1 and 3, respectively. Thus, in FIG. 1 delay line 30 and coupler 32 may be deleted and a real target (not shown) positioned in the RF beam illumination from antenna 18 at a known fixed distance outside the expected range of a target whose range is to be determined. Similarly, in FIG. 3 delay line 64 may be replaced by an antenna, similar to antenna 18 but pointing in a different direction from antenna 18, and by a real target at a known distance illuminated by the RF beam from the new antenna. The new target may be inside or outside the range of target 20 whose distance is to be measured. No meaningful substitution by a real target for delay line 31 (FIG. 2) can be made.

It will, thus, be understood that the phase means simulating a target at a known range as used in various ones of the claims is intended to encompass a real target at a known range.

A radar ranging system of the type illustrated in FIG. 3 has been implemented for use in measuring the level of material (i.e., the "burden") in a blast furnace.

What is claimed is:

1. In a frequency modulated continuous wave ranging system of the type including: first means for generating a continuous wave interrogation signal, said interrogation signal being frequency modulated in accordance with a desired waveform having predetermined parameters enabling measurement of the range, R, of a target of interest, at least one of said parameters being subject to undesired changes in value which change the measured range; second means for transmitting said interrogation signal to a target and receiving reflected signals from said target; and third means for deriving difference signals indicative of the frequency difference of said reflected signals from the instantaneous frequency of said interrogation signal, said difference signals being indicative of said range; the improvement comprising:
    fourth means also responsive to said interrogation signal and said undesired changes therein for deriving difference signals indicative of the distance of a target at a known distance;
    fifth means responsive to said difference signals from said third means for determining a parameter of the same representative of target range and responsive to the signals from said fourth means for scaling said parameter.

2. The combination as set forth in claim 1 wherein said fifth means is a digital counter responsive to said signal from said third means for counting cycles of the same and responsive to signals from said fourth means for resetting the same, the maximum count in said counter before it is reset being indicative of said range.

3. The combination as set forth in claim 1 wherein said fourth means includes a delay line simulating said target at said known distance.

4. The combination as set forth in claim 3 wherein said fourth means includes a directional coupler coupled between said delay line and said second means for passing said interrogation signals therebetween and also includes means coupled to said third means for passing signals, being said signals from said fourth means, relating to the distance simulated by said delay line.

5. The combination as set forth in claim 3 wherein said fourth means includes a first directional coupler coupled between said first means and said delay line for passing signals thereto and a second directional coupler between said delay line and third means for passing delayed signals to said third means and including means coupled to said third means for passing signals, being said signals from said fourth means relating to the distance simulated by said delay line.

6. The combination as set forth in claim 3 wherein said fourth means also includes a three port circulator, a mixer, a first directional coupler coupling between said source of interrogation signals and one port of said three port circulator, said delay line being coupled to a second port of said three port circulator for permitting bidirectional passage of signals therebetween and said mixer being coupled to the remaining port of said three port circulator to receive reflected signals from said delay line thereat, and wherein said fourth means also includes a second directional coupler coupled between said source of interrogation signals and said mixer, said mixer deriving difference signals indicative of a frequency difference of said reflected signals from said delay line and the instantaneous signal of said first means, said fourth means also including a divide-by-N circuit coupled to said mixer for producing a signal which is said signal from said fourth means.

7. In a frequency modulated continuous wave ranging system, comprising in combination:
    means for generating a continuous wave interrogation signal, said interrogation signal being frequency modulated in accordance with a desired waveform having predetermined parameters enabling computation of the range, R, of a target of interest, at least one of said parameters being subject to undesired changes in value which change the computed range;
    means for transmitting said interrogation signal to a real target at a distance within the range $R_1$ to $R_2$ and receiving reflected signals from said real target;
    means for deriving difference signals indicative of the frequency difference of said reflected signals from the instantaneous frequency of said interrogation signal, said difference signals being indicative of said range of targets represented by said reflected signals;
    means simulating a target at a known range not within said range $R_1$ to $R_2$;
    means coupling said interrogation signal to said target simulating means and coupling the reflected signal therefrom to said means for deriving difference signals;
    first and second bypass filters coupled to said means for deriving difference signals, said first bypass filter passing frequencies of said difference signal associated with said real target, said second bypass filter passing frequencies of said difference signal associated with said simulated target;

a divide-by-N circuit coupled to said second bandpass filter to produce a pulse for each N cycles of said frequency signal passed by said second bandpass filter; and a counter means having count and reset terminals, wherein said first bandpass filter is coupled to said count terminal for advancing said counter for each cycle of signal passed by said first bandpass filter and wherein said divide-by-N circuit is coupled to the reset terminal of said counter for resetting the same by each said pulse, and wherein the maximum count in said counter before being reset represents the range of said real target.

8. The combination as set forth in claim 7 wherein said means to simulate a target is a delay line operating in the reflective mode and wherein said coupling means comprises solely a single directional coupler through which interrogation signals pass to said delay line and through which said reflected signals from said delay line pass to said means for deriving difference signals.

9. The combination as set forth in claim 7 wherein said means simulating target is a delay line operated in the transmission mode and wherein said coupling means comprises first and second directional couplers, said first directional coupler arranged to couple said interrogation signals to said delay line and said second directional coupler arranged to couple signals from said delay line to said means for deriving difference signals.

10. In a frequency modulated continuous wave ranging system, comprising in combination:

means for generating a continuous wave interrogation signal, said interrogation signal being frequency modulated in accordance with a desired waveform having predetermined parameters enabling computation of the range, R, of a target of interest, at least one of said parameters being subject to undesired changes in value which change the computed range;

means for transmitting said interrogation signal to a real target and receiving reflected signals from said real target;

first means for deriving difference signals indicative of the frequency difference of said reflected signals from the instantaneous frequency of said interrogation signal, said difference signals being indicative of said range of targets represented by said reflected signals;

means simulating a target at a known range;

means coupling said interrogation signal to said means for simulating a target and producing a delayed signal therefrom, delayed in accordance with the distance simulated by said target simulating means;

a second means receptive of said interrogation signal and of said delayed signal for deriving difference signals indicative of the frequency difference of said delayed signal from the instantaneous frequency of said interrogation signal, said difference signals produced thereby being indicative of the simulated range of said simulated target;

a divide-by-N circuit coupled to said second means for deriving a difference signal for producing a pulse for each N cycles from said second means;

a counter means having count and reset terminals wherein said first means for deriving difference signals is coupled to said count terminal for advancing said counter for each cycle of the signal produced by said first means and wherein said divide-by-N circuit is coupled to the reset terminal of said counter means for resetting the same by each said pulse and wherein the maximum count in said counter represents the range of said real target.

11. The combination as set forth in claim 10 wherein said means simulating a target is a delay line arranged to operate in the reflective mode.

* * * * *